United States Patent [19]
Templin et al.

[11] Patent Number: 5,451,094
[45] Date of Patent: Sep. 19, 1995

[54] SEAT AND OCCUPANT RESTRAINT SYSTEM

[75] Inventors: Harry W. Templin, Carmel; Keith H. Freeman, Cicero; Jeffry L. Williams, Zionsville; William J. Hurley, Carmel, all of Ind.

[73] Assignee: Indiana Mills & Manufacturing, Inc., Westfield, Ind.

[21] Appl. No.: 266,020

[22] Filed: Jun. 27, 1994

[51] Int. Cl.⁶ .......................... B60N 2/42; B60R 21/00
[52] U.S. Cl. ................... 297/216.17; 297/480; 297/468; 296/68.1
[58] Field of Search ................ 297/216.16, 216.17, 297/216.19, 216.2, 480, 468; 296/68.1

[56] References Cited

U.S. PATENT DOCUMENTS 4,025,110  5/1977  Poorman ....................... 297/468
4,257,626  3/1981  Adomeit ....................... 297/216.2
5,015,010  5/1991  Homeier et al. .
5,219,207  6/1993  Anthony et al. .

FOREIGN PATENT DOCUMENTS 3237167  4/1984  Germany .................. 297/216.16

Primary Examiner—Peter R. Brown
Assistant Examiner—Anthony Barfield
Attorney, Agent, or Firm—Woodard, Emhardt, Naughton, Moriarty & McNett

[57] ABSTRACT

A restraint system for moving a vehicle seat and occupant toward the vehicle floor. A fluid cylinder pivotally mounted to the floor has an extendable piston rod connected to a linkage mounted to the vehicle seat. A three point belt assembly mounted to the seat is connected to the cylinder rod. Retraction of the cylinder rod pretensions or tightens the three point buckle assembly and subsequently moves the seat towards the vehicle floor.

8 Claims, 4 Drawing Sheets

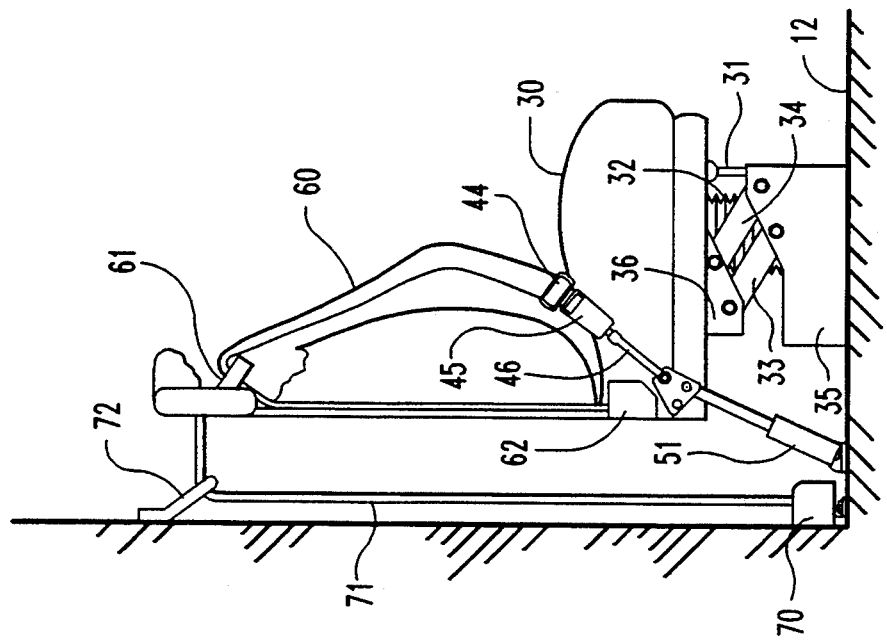
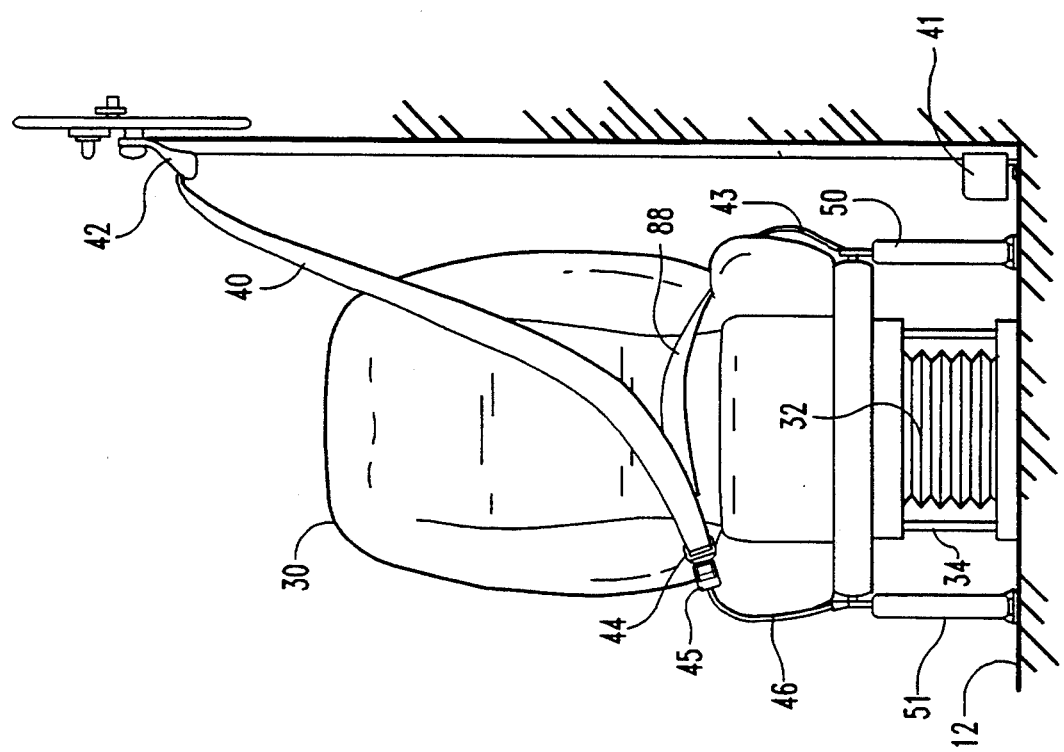

SEAT AND OCCUPANT RESTRAINT SYSTEM

BACKGROUND OF THE INVENTION

1. Field of the Invention

This invention is in the field of tethers, harnesses, and other restraint systems used in vehicles.

2. Description of the Prior Art

A variety of different types of restraint systems have been devised for securing passengers, cargo and seats within a vehicle. For example, the commonly owned U.S. Pat. No. 5,015,010 discloses a tether securing a seat frame to a vehicle floor, a three point belt system entirely mounted to the seat frame restraining the seat occupant, and a retractor belt combination extending between the vehicle floor and the top of the seat isolating the seat back from passenger force exerted against the seat belt.

In order to limit seat movement during a crash, it has been the practice to tether the seat to the floor; however, a fixed tether limits the horizontal adjustability of the seat. In the commonly owned U.S. Pat. No. 5,219,207, an automatic locking tether for the vehicle seat is disclosed wherein the seat may be horizontally adjusted to the specific requirements of the occupant. Passenger loading during a crash results in the automatic locking of the tether.

Seats provided within large trucks typically are suspendedly mounted atop the vehicle floor. For example, a cushioned air bag may be positioned between the bottom of the seat and floor thereby providing a cushioned ride. Such seats are typically positioned a substantial distance from the vehicle floor. It is therefore desirable to provide a restraint system which will move the seat and occupant toward the floor during a crash thereby providing a more compact seat occupant envelope. Disclosed herein is such a system.

SUMMARY OF THE INVENTION

One embodiment of the present invention is a device for retracting a vehicle seat having a seat back during a crash of the vehicle comprising a seat retractor connected between the seat and the vehicle and operable upon crash of the vehicle to move the seat toward the floor.

Another embodiment of the present invention includes a seat retractor upon crash of a vehicle for moving the vehicle seat toward the vehicle floor. The seat retractor has a belt device mounted to the seat to restrain an occupant thereon. A belt retractor is connected between the seat retractor and the belt device and is operable upon crash of the vehicle to tighten the belt device prior to the seat retractor moving the seat toward the floor.

It is an object of the present invention to provide a restraint system for a vehicle seat and occupant.

A further object of the present invention is to provide a restraint system for moving a vehicle seat towards the vehicle floor during a crash.

An additional object of the present invention is to provide a restraint system operable upon crash of the vehicle to first tighten the seat belt and then move the seat with occupant towards the vehicle floor.

Related objects and advantages of the present invention will be apparent from the following description.

BRIEF DESCRIPTION OF THE DRAWINGS

FIG. 2 is a front view of the preferred embodiment of the seat incorporating the present invention.

FIG. 3 is a side view of a first alternate embodiment of the seat incorporating the present invention.

DESCRIPTION OF THE PREFERRED EMBODIMENTS

Figure 1:
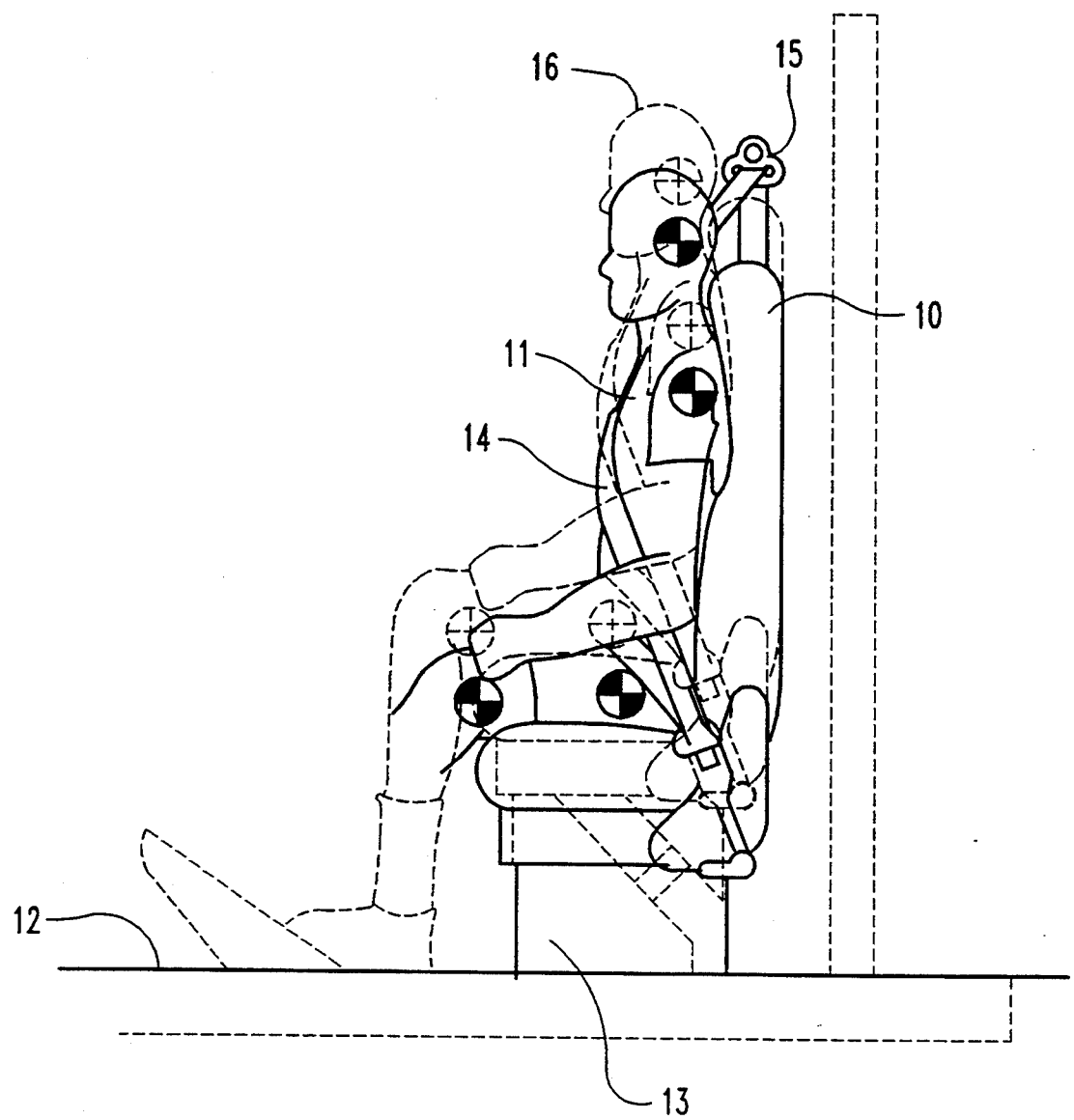
FIG. 1 is a side view of a vehicle seat showing vertical excursion.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts a typical suspension seat 10 utilized in a heavy truck. Seat 10 is mounted by means of an air bag within housing 13 atop vehicle floor 12. Occupant 11 is secured within the seat by means of a conventional three point belt assembly 14 with the belt extending through a D-loop 15 mounted to the B pillar of the truck. One end of the belt is secured to a retractor mounted either directly to the vehicle or to the frame of the seat. Dash line 16 depicts the upper limit of the vertical movement of the occupant. The amount of vertical movement will vary with each type of seat; however, a typical seat has a vertical movement of approximately four inches unless the vehicle rolls over in which case the vertical movement may increase to approximately nine inches when the vehicle is in an upsidedown condition.

FIGS. 2 and 3 illustrate respectively the preferred and alternate embodiments of the restraint systems incorporating the present invention. Seats 30 of FIGS. 2 and 3 are identical except in FIG. 2 the retractor and D-loop used with the seat belt are mounted external of the seat, whereas in FIG. 3 the D-loop and associated retractor are mounted directly to the seat. In FIG. 3 an additional retractor and associated belt are used to isolate the seat back from passenger force applied to the belt during a crash. The restraint systems incorporating the present invention for moving the seat and occupant toward the vehicle flow are identical for use with the seats of FIGS. 2 and 3.

The conventional truck suspension vehicle seat includes an air or fluid bag 32 (FIG. 3) positioned between the bottom of the seat frame and vehicle floor 12. A pair of links 33 and 34 have their opposite ends pivotally mounted to depending brackets 36 attached to the seat frame and an upwardly extending bracket 35 mounted atop floor 12. Links 33 and 34 and brackets 35 and 36 are provided on each side of the seat allowing the seat to move vertical in a controlled manner. A conventional shock absorbing telescoping device 31 is fixed to and extends between the bottom of the seat frame and bracket 35. Device 31 is not shown in FIG. 2 to more clearly illustrate bag 32. The occupant may adjust the height of the seat by controlling the fluid pressure to bag 32. Conventional fluid controls are provided connecting the air bag to a source of pressurized fluid such as air.

A three point belt assembly 40 (FIG. 2) has one end of the belt attached to retractor 41 mounted to the vehicle floor with the belt then extending upwardly through a D-loop 42 mounted to the vehicle B pillar. The belt extends downwardly from D-loop 42 across the occupant and slidably through a conventional seat belt tongue 44 with the belt then extending from the tongue across the lap of the occupant with the opposite end 43 of the belt 88 connected to the restraint device 50 incorporating the present invention. A conventional seat belt buckle 45 is releasably lockable with tongue 44 and is mounted to a strap or other extending member 46, in turn, having its opposite end connected to restraint device 51. Restraint devices 50 and 51 are identical and are operable to pull the three point belt assembly 40 and seat downwardly in the crash mode.

The three point belt assembly 60 shown in FIG. 3 is identical to the three point belt assembly 40 with the exception that D-loop 61 is mounted directly to the back of the seat as contrasted to the mounting of D-loop 42 to the B pillar. Further, one end of the belt utilized in the three point belt assembly 60 is connected to retractor 62 mounted directly to the seat frame. Thus, in the embodiment shown in FIG. 3, the belt extends upwardly from retractor 62 through D-loop 61 and then downwardly across the occupant with the belt then slidably extending through tongue 44 with the opposite end of the belt being attached to a restraint device 50 positioned on the opposite side of the seat from that depicted in FIG. 3. Likewise, buckle 45 in FIG. 3 is connected to a belt, cable 46 or other elongated device, in turn, connected to restraint device 51. A three point belt assembly and D-loop, wherein the D-loop is mounted to the B pillar but the retractor for the three point belt assembly is mounted directly to the seat frame is disclosed in the commonly owned U.S. Pat. No. 5,176,402 which is herewith incorporated by reference.

In FIG. 3, an additional retractor 70 is mounted directly to the vehicle having a belt 71 which extends upwardly through guide 72 affixed to the B pillar with the end of the belt attached to D-loop 61 such as shown in the commonly owned U.S. Pat. No. 5,015,010 which is herewith incorporated by reference. Retractor 70 is therefore operable to isolate the seat back from the forces exerted by the passenger against the three point belt assembly 60 by directing the forces directly from the belt to D-loop 61 and then via belt 71 to the vehicle instead of directing the force to the back of the seat for absorption.

Figure 4:
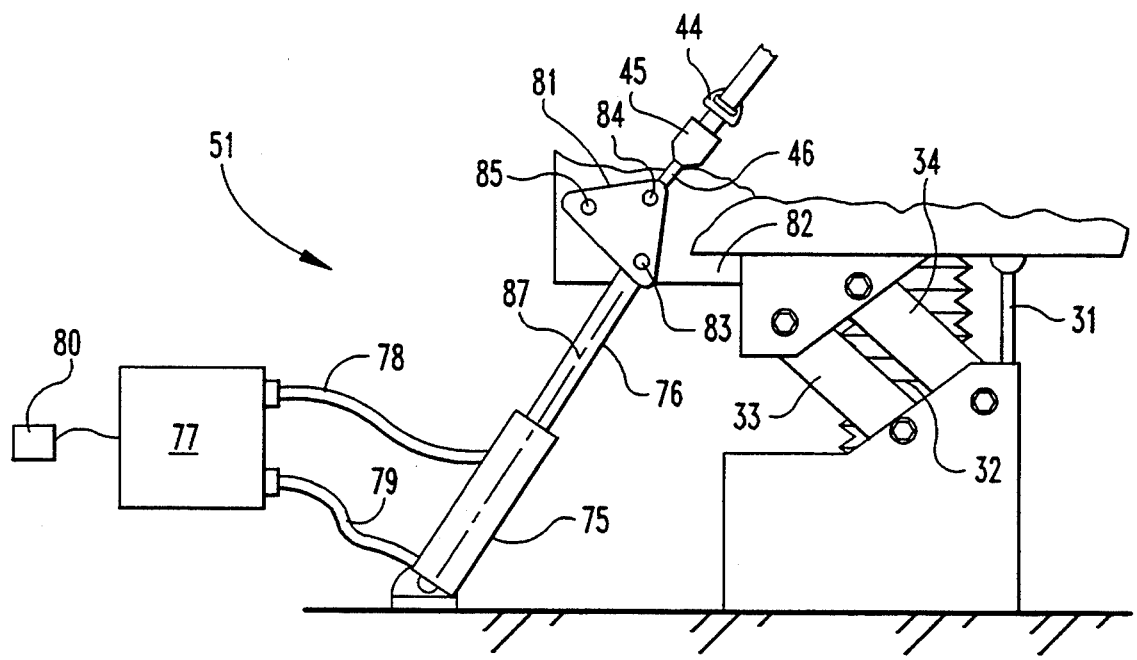
FIG. 4 is an enlarged fragmentary view of the seat of FIG. 3 in a nodal mode.
Figure 5:
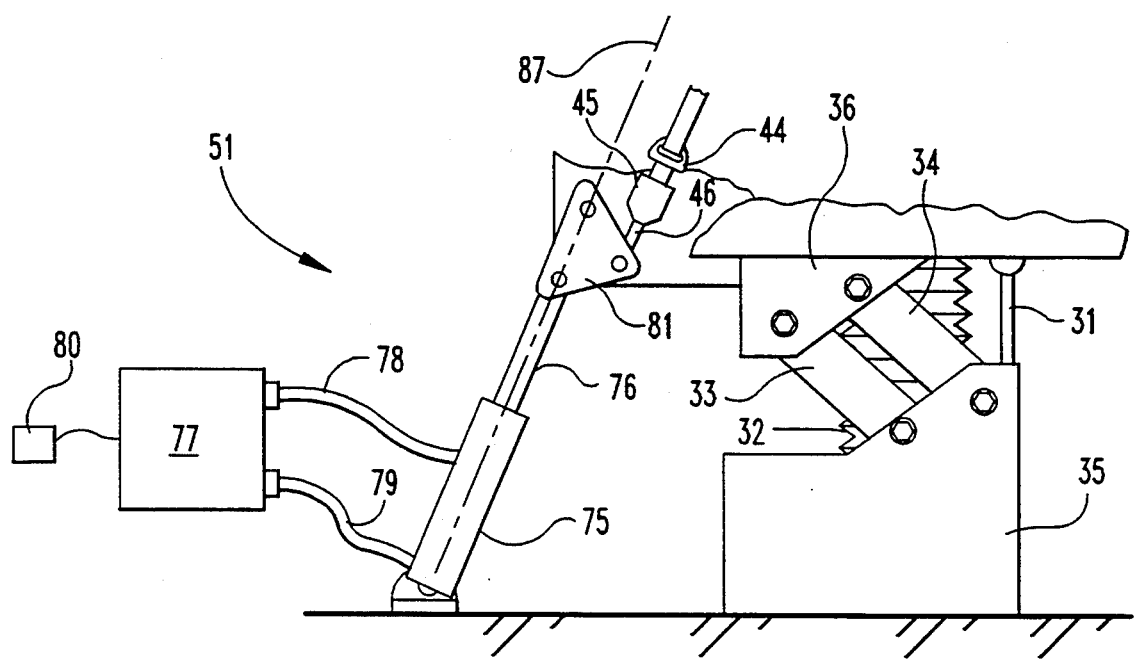
FIG. 5 is the same view as FIG. 4 only showing the seat in the crash mode.
Figure 7:
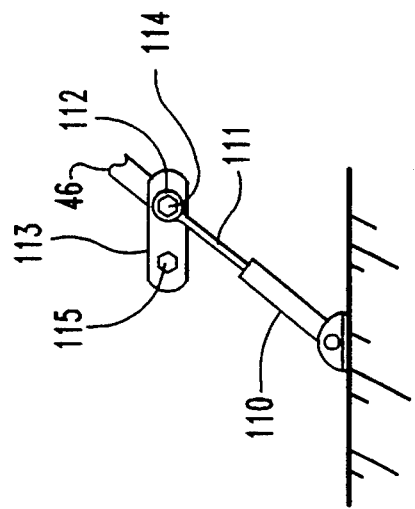
FIGS. 6–9 are side diagrammatic views of various alternate linkages for the seat of FIGS. 2 and 3.
Figure 9:
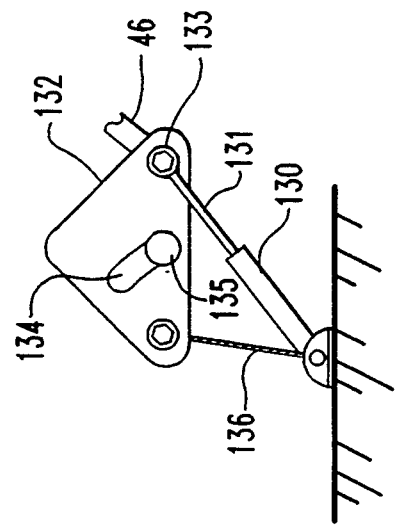
Figure 6:
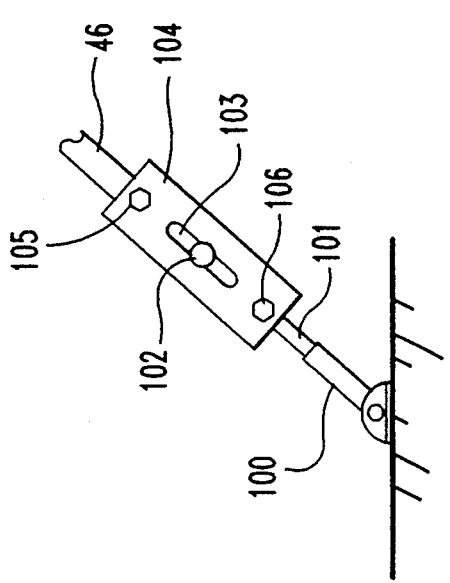
Figure 8:
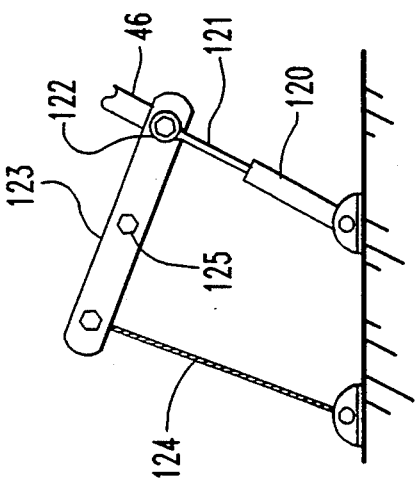

Restraint devices 50 and 51 are identical and thus the following description for restraint device 51 will apply equally to device 50. Restraint device 51 is depicted in FIG. 4 in the normal mode and in FIG. 5 in the crash mode. The restraint device includes a fluid cylinder 75 pivotally mounted to vehicle floor 12. The cylinder has an extendable and retractable piston rod 76 with cylinder 75 connected to a source of pressurized fluid 77 via fluid lines 78 and 79. A conventional motion sensor 80 is connected via conventional circuitry to source 77 and is operable when the vehicle crashes to detect changes in velocity activating the source of pressurized fluid 77 and causing cylinder 75 to retract piston rod 76.

The outer distal end of piston rod 76 is pivotally mounted by pivot joint 83 to a timing plate 81 pivotally mounted by pivot joint 85 to seat frame 82. Seat belt buckle 45 is connected by member 46 by pivot joint 84 to timing plate 81. Prior to crash, pivot joint 85 is located at a position spaced apart from axis 87 (FIG. 4) which extends along the length of pivot rod 76. Once sensor 80 has detected a change in vehicle velocity, piston rod 76 is retracted thereby pivoting timing plate 81 in a clockwise direction, as viewed in FIG. 4, about pivot joint 85 until pivot joint 85 is located on axis 87. As plate 81 moves from the position of FIG. 4 to the position of FIG. 5, buckle 45, tongue 44 and the three point belt assembly will be pulled downwardly and tightened thereby moving the occupant downwardly into the cushion of the seat. Simultaneously, the opposite end 43 (FIG. 2) of the lap portion 88 of the belt is pulled downwardly by restraint device 50 and retractor 41 or 62 lock preventing further extension of the belt. Even though retractors 41 and 62 have locked, the retracting devices 50 and 51 will pull the occupant and seat downwardly towards the vehicle floor since the belt in the three point belt assembly will stretch and further due to the normal slack existing in the three point belt assembly. Once plate 81 has pivoted to the position depicted in FIG. 5, pivot joint 85 is located on axis 87 and further retraction of rod 76 will pull seat frame 82 downwardly toward the vehicle floor. Various timing linkages are possible in addition to the timing plate 81. Such alternate linkages are depicted in FIGS. 6-9.

Fluid cylinder 100 is pivotally mounted to the vehicle floor and has an extendable and retractable piston rod 101 with a distal end 106 pivotally connected to plate 104. Buckle 45 is connected to member 46 in turn pivotally connected by joint 105 to plate 104. Buckle 45 along with sensor 80 and the source of pressurized fluid 77 have not been shown in FIGS. 6-9; however, it is to be understood that the buckle and source of pressurized fluid are connected respectively to member 46 and the fluid cylinder in a manner similar to that depicted in FIG. 4. Projection 102 is fixedly mounted to seat frame 82 and is slidable within slot 103 of plate 104. Retraction of rod 101 causes end 106 and plate 104 to move downwardly thereby pulling downward buckle 45 and the attached three point belt assembly. Eventually, projection 102 will reach the top end of slot 103 thereby transferring the downward pull to seat frame 82 forcing the seat downward. Plate 104 is pivotally mounted to projection 102 allowing the buckle to be positioned conveniently with respect to the seat occupant. Fluid cylinder 110 (FIG. 7) is pivotally mounted to the vehicle floor and has an extendable piston rod 111 with a distal end 112 pivotally connected to linkage 113. End 112 of rod 111 is positioned at one end of linkage 113 and is also connected via pivot joint 114 to member 46, in turn, attached to buckle 45. The opposite end of linkage 113 is connected via pivot joint 115 to seat frame 82. Retraction of rod 111 results in the downward movement of pivot joint 114 and member 46 along with the three point belt assembly pulling the occupant downward until eventually linkage 113 has pivoted sufficiently clockwise to align pivot joints 114 and 115 with the longitudinal axis of rod 111 thereby transferring the downward force to seat frame 82 and pulling the seat downwardly towards the floor.

Fluid cylinder 120 (FIG. 8) is pivotally mounted to the vehicle floor and has an extendable piston rod 121 with an outer distal end 122 pivotally connected to one end of linkage 123 with the opposite end of the linkage tethered to the vehicle floor by means of cable or web 124. Linkage 123 is pivotally mounted to the seat extension 82 via pivot joint 125 whereas member 46 attached to buckle 45 is pivotally connected to the distal end 122 of piston rod 121. Thus, retraction of piston rod 121 results in the clockwise rotation of linkage 123 about pivot joint 125 until cable 124 assumes a taut condition. Prior to cable 124 becoming taut, retraction of piston rod 121 will pull the three point buckle assembly downward. Once cable 124 is taut, further retraction of piston rod 121 will result in the downward force being applied to pivot joint 125 pulling the seat downwardly.

Fluid cylinder 130 (FIG. 9) is pivotally mounted to the vehicle floor and has an extendable piston rod 131 with an outer end 133 pivotally connected to plate 132 having a slot 134 through which projection 135 extends. Projection 135 is fixedly mounted to seat extension 82 and is slidable along the length of slot 134. The opposite end of plate 132 is connected to the vehicle floor by means of rigid member 136. Member 46 connected to buckle 45 is pivotally connected to the distal end 133 of piston rod 131. Thus, retraction of piston rod 131 results in downward force being applied to the buckle thereby pulling downward the three point buckle assembly until eventually plate 132 moves sufficiently positioning projection 135 at the upper end of slot 134. Further retraction of piston rod 131 thereby transfers the downward pull to projection 135 and the seat frame resulting in the seat being pulled downwardly toward the floor. As shown in FIG. 2, the seat is equipped with a restraint device 50 and 51 on the opposite sides of the seat. Thus, the fluid cylinders and accompanying linkages depicted in FIGS. 6–9 are positioned on each side of the seat in a manner similar to that depicted in FIG. 2. While the invention has been illustrated and described in detail in the drawings and foregoing description, the same is to be considered as illustrative and not restrictive in character, it being understood that only the preferred embodiments have been shown and described and that all changes and modifications that come within the spirit of the invention arc desired to be protected.

What is claimed is:

1. A seat restraint system mountable to a vehicle floor comprising:
    a seat frame and seat;
    vehicle suspension seat means connected to said scat frame and seat and for mounting to a vehicle floor operable to allow said seat frame and seat to move to and from the vehicle floor;
    belt means mounted to said seat frame and seat to restrain an occupant thereon; and,
    seat retracting means connected to said seat frame and seat operable to move said seat frame and seat toward the vehicle floor upon crash and wherein:
    said seat retracting means includes a fluid cylinder and a source of pressurized fluid connected thereto, said fluid cylinder has a retractable cylinder rod connected to said seat frame and seat, said seat retracting means upon crash applying fluid pressure to said fluid cylinder moving said cylinder rod to move said seat frame and seat toward the vehicle floor.

2. A seat restraint system mountable to a vehicle floor comprising:
    a seat frame and said;
    vehicle suspension seat means connected to said seat frame and seat and for mounting to a vehicle floor operable to allow said seat frame and seat to move to and from the vehicle floor;
    belt means mounted to said seat frame and seat to restrain an occupant thereon; and,
    seat retracting means connected to said seat frame and seat operable to move said seat frame and seat toward the vehicle floor upon crash and further comprising:
    timing means associated with said belt means and said seat retracting means with said timing means operable with said seat retracting means to tighten said belt means prior to said seat retracting means moving said seat frame and seat toward the vehicle floor.

3. The seat restraint system of claim 2 wherein:
    said timing means includes a member movably mounted to said seat frame and seat and connected between said seal retracting means and said belt means, said member including a pre-crash position and a crash position on said seat frame and seat with said seat retracting means moving said member from said pre-crash position while pulling and lightening said belt means to said crash position whereat further movement of said seat retracting means moves said seat frame and seat toward the vehicle floor.

4. The seat restraint system of claim 3 wherein:
    said member is pivotally mounted to said seat frame and seat at a first pivot joint with said seat retracting means connected to said member at a second pivot joint, said seat retracting means includes an axis extending through said second pivot joint, said first pivot joint moves to a location on said axis when in said crash position.

5. A seat restraint system mountable to a vehicle floor comprising:
    a vehicle suspension seat;
    suspension means connected to said seat and for connecting to a vehicle floor and operable to allow said seat to allow said seat to move to and from the vehicle floor;
    a belt mounted to said seat to restrain an occupant thereon; and,
    a seat retractor connected to said seat to move said seat toward the vehicle floor upon crash and wherein:
    said seat retractor includes a fluid cylinder and a source of pressurized fluid connected thereto, said fluid cylinder has a retractable cylinder rod connected to said seat, said seat retractor upon crash applying fluid pressure to said fluid cylinder moving said cylinder rod to move said seat toward the vehicle floor.

6. A seat restraint system mountable to a vehicle floor comprising:
    a vehicle suspension seat;
    suspension means connected to said seat and for connecting to a vehicle floor and operable to allow said seat to move to and from the vehicle floor;
    a belt mounted to said seat to restrain an occupant thereon; and,
    a seat retractor connected to said seat to move said seat toward the vehicle floor upon crash and further comprising:
    a timer means associated with said belt and said seat retractor for tightening said belt prior to said seat retractor moving said seat toward the vehicle floor.

7. The seat restraint system of claim 6 wherein:

said timer means includes a member movably mounted to said seat and connected between said seat retractor and said belt, said member including a pre-crash position and a crash position on said seat with said seat retractor moving said member from said pre-crash position while pulling and tightening said belt to said crash position whereat further movement of said seat retractor moves said seat toward the vehicle floor.

8. A seat restraint system for a vehicle comprising:

a seat;

a mount;

seat retracting means fixed to said mount and connected between said seat and said mount and operable upon crash to move said seat toward said mount;

belt means mounted to said seat operable to restrain an occupant thereon; and, belt retracting means connected between said seat retracting means and said belt means and operable upon crash to tighten said belt means prior to said seat retracting means moving said seat toward said mount.

* * * * *

UNITED STATES PATENT AND TRADEMARK OFFICE
CERTIFICATE OF CORRECTION

PATENT NO.    : 5,451,094
DATED         : September 19, 1995
INVENTOR(S)   : Harry W. Templin, Keith H. Freeman, Jeffry L. Williams and William J. Hurley It is certified that error appears in the above-identified patent and that said Letters Patent is hereby corrected as shown below:

Column 2, line 9 change the word "nodal" to the word --normal--.
Column 5, line 48 change the word "scat" to the word --seat--.
Column 5, line 67 change the word "said" to the word --seat--.

Signed and Sealed this

Sixteenth Day of January, 1996

Attest:

BRUCE LEHMAN

Attesting Officer    Commissioner of Patents and Trademarks